Feb. 10, 1925.
J. P. DOOLING
1,525,803
MOUNT FOR VALVES FOR INFLATABLE ARTICLES
Filed March 18, 1924
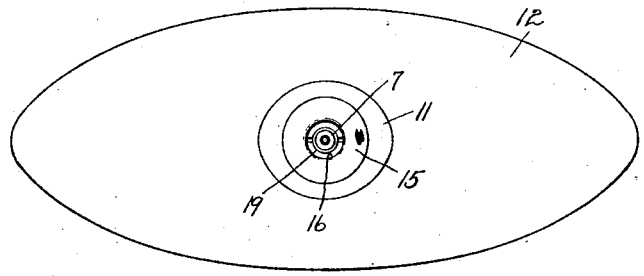
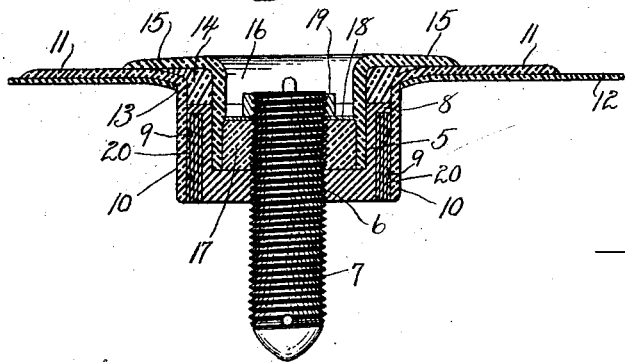
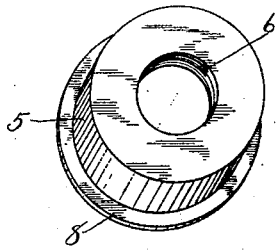

Patented Feb. 10, 1925.

1,525,803

UNITED STATES PATENT OFFICE.

JOSEPH P. DOOLING, OF NEW HAVEN, CONNECTICUT.

MOUNT FOR VALVES FOR INFLATABLE ARTICLES.

Application filed March 18, 1924. Serial No. 699,989.

*To all whom it may concern:*

Be it known that I, JOSEPH P. DOOLING, a citizen of the United States, residing at New Haven, in the county of New Haven and State of Connecticut, have invented a new and useful Improvement in Mounts for Valves for Inflatable Articles; and I do hereby declare the following, when taken in connection with the accompanying drawings and the characters of reference marked thereon, to be a full, clear, and exact description of the same, and which said drawings constitute part of this application, and represent, in—

Fig. 1 a plan view of an inflatable article having a valve mounted therein, in accordance with my invention.

Fig. 2 a transverse sectional view of the valve-mounting on an enlarged scale.

Fig. 3 a perspective view of the valve mounting shell, detached.

This invention relates to improvement in mounts for valves for inflatable articles, particularly adapted for footballs, basketballs, etc., and especially provides for a mounting for a valve like that shown and described in an application filed by me on January 10, 1924, Serial Number 685,313. This valve consists of an externally-threaded body, and the object of this invention is to provide a mount for an externally-threaded valve-body providing for the convenient positioning of the valve and packing around the valve-body, and a firm support for the mounting, and the invention consists in the construction as hereinafter described and particularly recited in the claims.

In carrying out my invention, I employ a cup-shaped metal shell 5, formed with a central threaded opening 6 in its bottom, into which an externally-threaded valve-body 7 may be turned. The shell is also formed at its upper edge with an outwardly-extending flange 8. Around the shell, beneath the flange, is wound a strip of adhesive tape 20, which is secured by waxed ends 9, to form a surface against which the inwardly-turned edge 10 of a patch 11 may adhere. This patch is placed upon the outer surface of an article such as a football bladder 12 around an opening 13 therein, and is secured to the surface of the bladder. Resting upon the top of the shell is a packing 14 formed from cloth with adhesive material on both sides and commonly known in the rubber trade as "friction-packing," and this packing is covered by a top patch 15, the inner edge 16 of which is turned down into the shell. When thus assembled with an air-bag, the parts are vulcanized. Mounted on the valve-body is a packing-ring 17 of soft rubber, onto the top of which is placed a washer 18 to form a bearing for the screw-collar 19, which is turned onto the body of the valve, so as to compress the packing-ring 17 and expand it against the inwardly-turned surface of the top patch and cause it to crowd around the valve-body, so as to prevent leakage of air from the inside of the bladder outward around the screw-threads in the valve-body. This construction also provides for a comparatively large opening when the valve is removed, through which powdered soapstone or other suitable material may be entered into the bladder. It will be seen that this mounting is firmly connected with the air-container and is installed before vulcanization and before the valve is inserted and provides an air-tight joint around the valve-body.

I claim:

1. A valve mounting for inflatable articles, comprising a metal, cup-shaped shell formed in its bottom with a central threaded opening and at its upper edge with an outwardly-turned flange, a patch secured to the article and turned inward around the outer surface of the shell, and a top patch having its inner edge turned downward into the said shell.

2. A mount for valves for inflatable articles, comprising a metal, cup-shaped shell formed in its bottom with a threaded opening and at its upper edge with an outwardly-extending flange, a tape wound around the body of the shell, beneath said flange, a patch secured to the outer surface of the article around an opening therein, the inner edge of said patch extending downward around said shell, a friction-ring resting on the top of said shell, and a top patch secured to the said patch and having its inner edge turned downward inside of said shell.

3. A valve mounting for inflatable articles, comprising a metal, cup-shaped shell formed in its bottom with a threaded opening and at its upper edge with an outwardly-extending flange, a patch having its edge turned inward around the outside of said shell, a top patch secured to the surface of the said patch and having its inner edge turned inward inside of said shell, combined with an externally-threaded valve-body, a packing-ring in said shell around said body, and a threaded collar on said valve-body adapted to be turned therein to compress and expand the said packing-ring.

4. A valve mounting for inflatable articles, comprising a metal, cup-shaped shell formed in its bottom with a threaded opening and at its upper edge with an outwardly-extending flange, a patch having its edge turned inward around the outside of said shell, a top patch secured to the surface of the said patch and having its inner edge turned inward inside of said shell, combined with an externally-threaded valve-body, a packing-ring in said shell around said body, a threaded collar on said valve-body adapted to be turned therein to compress and expand the said packing-ring, and a washer interposed between the upper surface of the packing-ring and said collar.

In testimony whereof, I have signed this specification in the presence of two subscribing witnesses.

JOSEPH P. DOOLING.

Witnesses:
J. W. PATTERSON,
J. R. CALDWELL.